Patented Mar. 23, 1948

2,438,468

UNITED STATES PATENT OFFICE 2,438,468

OIL COMPOSITION

Jones I. Wasson, Union, and Carroll J. Wilson, Westfield, N. J., assignors to Standard Oil Development Company, a corporation of Delaware No Drawing. Application December 31, 1942, Serial No. 470,841

1 Claim. (Cl. 252—52)

The present invention relates to an improved oil composition, and relates more particularly to a petroleum oil composition containing a small proportion of a novel oxidation inhibitor.

It is well known in the art to improve the general quality and particular characteristics of mineral oils, particularly petroleum oils, by adding thereto various organic inhibiting agents. These materials serve to increase the ability of the oil to withstand operating conditions under which the oil would normally fail in a relatively short time. We have now discovered a class of substances which are particularly desirable for use as addition agents for petroleum oils. Our materials serve to produce an oil blend of unexpected stability which will not deteriorate under most severe operating conditions and pressures.

The inhibiting agents of our invention are tertiary alkyl ethers of naphthols, that is, ethers obtained by substituting a tertiary alkyl group for the hydrogen of a hydroxy group of a naphthol. Such ethers may be derived from either alpha or beta naphthols, but preferably the former, and there may be one or a plurality of such tertiary alkoxy groups attached to the naphthalene nucleus. The aromatic nucleus may contain various other substituent groups, such as alkyl, hydroxyl, alkoxy, amino, carboxyl, and various other organic groups, and groups obtained by substituting alkyl or aryl radicals in any such groups, as well as organic groups containing metal substituents. Included in the possible organic substituent groups are the long chain aliphatic radicals obtained from a petrolem wax or an ester wax. In such cases one wax group may be attached to each aryl group, or several aryl groups may be attached to one wax group at several points along the chain. The organic radicals forming a part of the ether group or attached directly to the nucleus should be of sufficient length, in total, to provide sufficient oil solubility. The preferred inhibitors are those which contain four or five carbon atoms in the tertiary alkyl group attached through the ether linkage, preferably also containing a substituent alkyl group attached directly to the nucleus.

Particular compounds selected from the above defined class of inhibitors are, for example, tertiary butyl ether of 4-isopropyl alpha naphthol, tertiary butyl ether of alpha naphthol, tertiary butyl ether of beta naphthol, tertiary amyl ether of alpha naphthol, tertiary amyl ether of beta naphthol, tertiary butyl ether of 4-amino alpha naphthol, tertiary amyl ether of 7-methyl beta naphthol, tertiary butyl ether of 4-chloro alpha naphthol, and tertiary amyl ether of 4-ethyl alpha naphthol.

The inhibitors of the present invention may be added to any mineral oil or to a fatty oil in order to improve the properties and qualities of said oil. They are, however, particularly adapted to utilization in petroleum oils which are to be subjected to working conditions employing elevated temperatures and pressures. The inhibitors may be added to the oil in any desired quantity, depending on the particular substances used and upon the character of the particular base oil to which it is added, as well as upon the working conditions to which said base oil is to be subjected. The quantity of inhibitor to be added may vary widely in the range from about 0.001 to about 2% or 3%. However, in general it is preferred to employ from about 0.05% to about 0.3%.

In order to further illustrate the invention the following example is given which is not to be construed as limiting the invention in any way whatsoever:

Example

A petroleum turbine oil having the following inspection:

| | |
|---|---|
| Gravity, A. P. I | 32 |
| Flash point °F | 425 |
| Saybolt universal viscosity at 100° F | 155 |
| Robinson color | 17 | was blended with 0.1% of the tertiary butyl ether of 4-isopropyl alpha naphthol and tested by the Staeger oxidation test, and a sample of the base oil without additive was similarly tested, in order to determine the susceptibility of the blend toward oxidation and deterioration.

The Staeger oxidation test was conducted as follows: 200 cc. of the oil were poured into a glass beaker of 400 cc. capacity. To accelerate aging a cleaned and polished copper strip 40 x 70 mm. and 1 mm. thick was put into the beaker as a catalyst. The beaker containing the oil and catalyst was placed on a rotating shelf in an oven, the oven temperature being maintained at 110° C. and the shelf rotated at 4 to 5 R. P. M. Purified air was blown through the oven at the rate of 1.5 to 2 cu. ft. per hour. The life of the oil was determined by observing the time required for the oil to show deterioration as evidenced by a neutralization number of 0.2.

The results of the tests applied to the blank oil and to the oil blend were as follows:

| | Staeger life (hours) |
|---|---|
| Turbine oil | 72 |
| Turbine oil+0.1% ter. butyl ether of 4-isopropyl alpha naphthol | 200+ |

It is to be understood that although the substances of the present invention are particularly adapted for improving the quality of petroleum lubricating oils, they may likewise be employed for the stabilization of hydrocarbons generally against oxidation, deterioration, and the like, for example, for the stabilization of petrolatums, petroleum waxes, motor fuels and the like, as well as for the stabilization of various vegetable and animal oils.

In addition to the materials to be added as part of the present invention other agents may also be present in the oils and other hydrocarbon products, such as dyes, pour depressors, sludge dispersers, thickeners, viscosity index improvers, oiliness agent, rubber-like materials, colloidal solids, etc.

The scope of the present invention is not to be limited by any theory or mode of operation nor by the examples which are given for purposes of illustration only, but solely by the terms of the appended claim.

We claim:

An oil composition having a high resistance against oxidation comprising a petroleum oil boiling in the lubricating oil range and a relatively small amount, sufficient to substantially inhibit deterioration, of tertiary butyl ether of 4-isopropyl alpha naphthol.

JONES I. WASSON.
CARROLL J. WILSON.

REFERENCES CITED

The following references are of record in the file of this patent:

UNITED STATES PATENTS

| Number | Name | Date |
|---|---|---|
| 2,335,017 | McNab | Nov. 23, 1943 |
| 2,285,752 | Van Ess | June 9, 1942 |
| 2,270,577 | Bergstrom | Jan. 20, 1942 |
| 2,263,664 | Wasson | Nov. 25, 1941 |
| 2,263,663 | Wasson | Nov. 25, 1941 |
| 2,216,752 | Rosen | Oct. 8, 1940 |
| 2,291,499 | Reiff | Feb. 27, 1940 |
| 2,114,832 | Evan | Apr. 19, 1938 |
| 2,114,812 | Reiff | Apr. 19, 1938 |
| 2,031,930 | Buc | Feb. 25, 1936 |

FOREIGN PATENTS

| Number | Country | Date |
|---|---|---|
| 483,306 | Great Britain | Apr. 14, 1938 |